(12) United States Patent
Takahashi et al.

(10) Patent No.: US 7,951,503 B2
(45) Date of Patent: May 31, 2011

(54) CURABLE RESIN COMPOSITION FOR FUEL CELL ELECTROLYTE FILM AND ELECTROLYTE FILM, PROCESS FOR PRODUCING THE SAME, ELECTROLYTE FILM/ELECTRODE ASSEMBLY, AND PROCESS FOR PRODUCING THE SAME

(75) Inventors: Mitsuhito Takahashi, Annaka (JP); Toshio Ohba, Annaka (JP); Nobuo Kawada, Annaka (JP); Shigeru Konishi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 889 days.

(21) Appl. No.: 11/571,620

(22) PCT Filed: May 20, 2005

(86) PCT No.: PCT/JP2005/009223
§ 371 (c)(1),
(2), (4) Date: Jan. 4, 2007

(87) PCT Pub. No.: WO2006/011286
PCT Pub. Date: Feb. 2, 2006

(65) Prior Publication Data
US 2007/0160888 A1   Jul. 12, 2007

(30) Foreign Application Priority Data
Jul. 23, 2004   (JP) .................. 2004-216103

(51) Int. Cl.
*H01M 8/10* (2006.01)
*H01M 8/00* (2006.01)

(52) U.S. Cl. .................... 429/494; 429/535
(58) Field of Classification Search .............. 429/30, 429/31, 32, 33, 46, 188, 189, 303, 304, 306, 429/309, 317
See application file for complete search history.

(56) References Cited

U.S. PATENT DOCUMENTS
2005/0118478 A1 * 6/2005 Kiefer et al. ............. 429/33
(Continued)

FOREIGN PATENT DOCUMENTS
JP   9 312162   12/1997
(Continued)

OTHER PUBLICATIONS
Viral Mehta, et al., "Review and Analysis of PEM Fuel Cell Design and Manufacturing", Journal of Power Sources, vol. 114, pp. 32-53, 2003.

*Primary Examiner* — Dah-Wei D Yuan
*Assistant Examiner* — Stephan Essex
(74) *Attorney, Agent, or Firm* — Oblon, Spivak, McClelland, Maier & Neustadt, L.L.P.

(57) ABSTRACT

A curable resin composition for fuel cell electrolyte films characterized by comprising (1) 100 parts by mass of a monomer having at least one ethylenically unsaturated group per molecule and having, per molecule, either at least one, tonically conductive group or at least one precursor group capable of giving an tonically conductive group through a chemical reaction, (2) 10-400 parts by mass of an oligomer which has, per molecule, at least two reactive groups copolymerizable with the ethylenically unsaturated group of the ingredient (1) and has a number-average molecular weight of 400 or higher, (3) 10-400 parts by mass of a fluororesin, and (4) 0-2,000 parts by mass of a solvent.

8 Claims, 1 Drawing Sheet

U.S. PATENT DOCUMENTS

2005/0118479 A1 * 6/2005 Yamaguchi et al. ............ 429/33

FOREIGN PATENT DOCUMENTS

| | | |
|---|---|---|
| JP | 2001 167638 | 6/2001 |
| JP | 2003 203646 | 7/2003 |
| JP | 2003 217342 | 7/2003 |
| JP | 2003 217343 | 7/2003 |
| JP | 2003 317539 | 11/2003 |
| JP | 2005 89682 | 4/2005 |
| JP | 2005 123070 | 5/2005 |
| WO | 03 033576 | 4/2003 |
| WO | WO 03074595 A1 * | 9/2003 |
| WO | WO 03081706 A1 * | 10/2003 |

* cited by examiner

CURABLE RESIN COMPOSITION FOR FUEL CELL ELECTROLYTE FILM AND ELECTROLYTE FILM, PROCESS FOR PRODUCING THE SAME, ELECTROLYTE FILM/ELECTRODE ASSEMBLY, AND PROCESS FOR PRODUCING THE SAME

TECHNICAL FIELD

This invention relates to a curable resin composition for polymer electrolyte fuel cell electrolyte films, an electrolyte film and its preparation using the resin composition, and a fuel cell electrolyte film/electrode assembly and its preparation.

BACKGROUND ART

Fuel cells using solid polymer electrolyte (SPE) films are expected to find widespread practical use as power supplies for electric cars and small-size auxiliary power supplies due to a low operating temperature below 100° C. and a high energy density. For such SPE fuel cells, constituent technologies relating to electrolyte films, platinum base catalysts, gas diffusion electrodes, and electrolyte film/electrode assemblies are important. Among others, the electrolyte films and electrolyte film/electrode assemblies are one of the most important technologies relating to the performance of fuel cells.

In SPE fuel cells, an electrolyte film on its opposite sides is combined with a fuel diffusion electrode and an air diffusion electrode so that the electrolyte film and the electrodes form a substantially integral structure. Then the electrolyte film not only acts as an electrolyte for conducting protons, but also plays the role of a diaphragm for preventing a fuel such as hydrogen or methanol from directly mixing with an oxidant such as air or oxygen even under applied pressure. From the electrolyte aspect, the electrolyte film is required to have a high ion (proton) transfer velocity, a high ion exchange capacity, and a high and constant water-retaining ability enough to maintain a low electric resistance. The role of a diaphragm, on the other hand, requires the electrolyte film to have a high dynamic strength, dimensional stability, chemical stability during long-term service, and no extra permeation of hydrogen gas or methanol as the fuel and oxygen gas as the oxidant.

Electrolyte films used in early SPE fuel cells were ion exchange films of hydrocarbon resins obtained through copolymerization of styrene with divinyl benzene. These electrolyte films, however, lacked practical usefulness due to very low durability. Thereafter, perfluorosulfonic acid-modified fluororesin films developed by E.I. duPont and commercially available under the trade mark "Nafion" have been widely used instead.

Conventional fluororesin base electrolyte films as typified by Nafion are improved in chemical durability and stability. However, when they are applied to direct methanol fuel cells (DMFC) using methanol as the fuel, a crossover phenomenon that methanol runs through the electrolyte film occurs, resulting in a reduced output. Another problem associated with conventional fluororesin base electrolyte films as typified by Nafion is an increased cost because their manufacture starts from the synthesis of monomers and requires a number of steps. This becomes a substantial bar against practical applications. The ion conductivity must be kept low in order to hold down the crossover of methanol. At the present, there is a trade-off between them. It remains unsolved to reduce the methanol crossover while maintaining a high ion conductivity.

With respect to the thickness of electrolyte films, as the film becomes thinner, proton conduction becomes easier and hence, fuel cells provide better power generation characteristics. Thin electrolyte films, however, suffer from a problem that they can be ruptured when an electrolyte film and electrodes are pressed together at elevated temperature to enhance the bond therebetween.

Efforts have been made to develop inexpensive electrolyte films that can replace the Nafion and similar films. A number of electrolyte films under study are described in Journal of Power Sources, 114 (2003), pp. 32-53. However, these electrolyte films after their film formation are joined to electrodes by pressing at elevated temperatures, which leaves problems of possible rupture of films and complex steps. The joining under heat and pressure does not always achieve a sufficient adhesion.

To improve the level of productivity and adhesion, JP-A 2003-203646 proposes to apply a solution of an electrolyte film in a solvent onto an electrode, and press bond the assembly with the solvent partially left therein. Since the electrolyte film has not been cured, only low adhesion is achieved.

JP-A 2003-217342 and JP-A 2003-217343 disclose crosslinking of electrolyte films for the purpose of improving durability. Since solid electrolyte films are crosslinked, subsequent press bonding at elevated temperatures is necessary to fabricate an electrolyte film/electrode assembly.

Also, WO 03/033576 discloses a method of controlling the fuel permeability of an electrolyte film by impregnating the electrolyte film with a non-electrolyte monomer, followed by polymerization. The non-electrolyte monomer is cured. However, since the film subject to impregnation is in solid form, subsequent press bonding at elevated temperatures is necessary.

DISCLOSURE OF THE INVENTION

Problem to be Solved by the Invention

An object of the present invention, which has been made under the above-described circumstances, is to provide curable resin compositions for forming fuel cell electrolyte films having excellent proton conduction and low methanol permeability when applied to DMFC; electrolyte films and electrolyte film/electrode assemblies; a method for producing electrolyte films at a high level of productivity; and a method for manufacturing electrolyte film/electrode assemblies in which an electrolyte film and electrodes are tightly joined without a need for hot pressing.

Means for Solving the Problem

Making extensive investigations to attain the above objects, the inventor has discovered that when a curable resin composition comprising (1) 100 parts by mass of a monomer containing per molecule at least one ethylenically unsaturated group and at least one ion conductive group or precursor group capable of forming an ion conductive group through chemical reaction, (2) 10 to 400 parts by mass of an oligomer containing per molecule at least two reactive groups copolymerizable with the ethylenically unsaturated group in component (1) and having a number average molecular weight of at least 400, (3) 10 to 400 parts by mass of a fluororesin, and (4) 0 to 2,000 parts by mass of a solvent is polymerized and cured by heating or ultraviolet or electron beam irradiation, the resulting cured film has excellent ion conductivity and satisfactory elongation and strength; that this cured film is useful as the electrolyte in a SPE fuel cell, i.e., an electrolyte film useful in fuel cells as demonstrated by minimized permeability of methanol as the fuel in the case of DMFC can be manufactured at a high level of productivity; that by coating the curable resin composition onto a first electrode having a catalyst borne thereon, forming a cured film by heating or ultraviolet or electron beam irradiation, and disposing a second electrode having a catalyst borne thereon contiguous to the cured film, or by coating the curable resin composition onto a first electrode having a catalyst borne thereon, disposing a second electrode having a catalyst borne thereon contiguous to the coated composition, and curing the coated composition into a cured film by heating or electron beam irradiation, an electrolyte film/electrode assembly in which the electrolyte film is tightly joined to the electrodes without a need for hot pressing and which is useful in fuel cells can be manufactured in an industrially advantageous manner. The invention is predicated on these findings.

Accordingly, the present invention provides a curable resin composition for fuel cell electrolyte films, a method for producing a fuel cell electrolyte film, and a method for manufacturing an electrolyte film/electrode assembly, as defined below.

Claim 1:

A curable resin composition for fuel cell electrolyte films, comprising (1) 100 parts by mass of a monomer containing per molecule at least one ethylenically unsaturated group and at least one ion conductive group or at least one precursor group capable of forming an ion conductive group through chemical reaction, (2) 10 to 400 parts by mass of an oligomer containing per molecule at least two reactive groups copolymerizable with the ethylenically unsaturated group in component (1) and having a number average molecular weight of at least 400, (3) 10 to 400 parts by mass of a fluororesin, and (4) 0 to 2,000 parts by mass of a solvent.

Claim 2:

The fuel cell electrolyte film-forming curable resin composition of claim 1, wherein the ion conductive group in component (1) is a sulfonic acid group.

Claim 3:

The fuel cell electrolyte film-forming curable resin composition of claim 1 or 2, wherein the fluororesin as component (3) is selected from the group consisting of polytetrafluoroethylene, tetrafluoroethylene-hexafluoropropylene copolymers, tetrafluoroethylene-perfluoroalkyl vinyl ether copolymers, polychlorotrifluoroethylene, ethylene-tetrafluoroethylene copolymers, polyvinylidene fluoride, polyvinyl fluoride, and trifluoroethylene-ethylene copolymers.

Claim 4:

A fuel cell electrolyte film comprising a cured film which is prepared by polymerizing (1) 100 parts by mass of a monomer containing per molecule at least one ethylenically unsaturated group and at least one ion conductive group or at least one precursor group capable of forming an ion conductive group through chemical reaction and (2) 10 to 400 parts by mass of an oligomer containing per molecule at least two reactive groups copolymerizable with the ethylenically unsaturated group in component (1) and having a number average molecular weight of at least 400, followed by curing, with the proviso that when component (1) contains the precursor group, the precursor group is converted into an ion conductive group, and (3) 10 to 400 parts by mass of a fluororesin which is uniformly dispersed and incorporated in the cured film.

Claim 5:

A method for producing a fuel cell electrolyte film, comprising the steps of:

coating the fuel cell electrolyte film-forming curable resin composition of claim 1, 2 or 3, wherein the monomer as component (1) contains the ion conductive group, onto a substrate to a buildup of up to 200 µm, and curing the coated curable resin composition to form a cured film by heating or ultraviolet or electron beam irradiation.

Claim 6:

A method for producing a fuel cell electrolyte film, comprising the steps of:

coating the fuel cell electrolyte film-forming curable resin composition of claim 1, 2 or 3, wherein the monomer as component (1) contains the precursor group capable of forming an ion conductive group, onto a substrate to a buildup of up to 200 µm, curing the coated curable resin composition to form a cured film by heating or ultraviolet or electron beam irradiation, and converting the precursor groups into ion conductive groups.

Claim 7:

An electrolyte film/electrode assembly for fuel cells, comprising an electrolyte film disposed between first and second electrodes each having a catalyst borne thereon, said electrolyte film comprising a cured film prepared by polymerizing (1) 100 parts by mass of a monomer containing per molecule at least one ethylenically unsaturated group and at least one ion conductive group or at least one precursor group capable of forming an ion conductive group through chemical reaction, and (2) 10 to 400 parts by mass of an oligomer containing per molecule at least two reactive groups copolymerizable with the ethylenically unsaturated group in component (1) and having a number average molecular weight of at least 400, followed by curing, with the proviso that if component (1) contains the precursor group, the precursor group is converted into an ion conductive group, and (3) 10 to 400 parts by mass of a fluororesin uniformly dispersed and incorporated in the cured film.

Claim 8:

A method for manufacturing an electrolyte film/electrode assembly for fuel cells, comprising the steps of:

coating the fuel cell electrolyte film-forming curable resin composition of claim 1, 2 or 3 onto a first electrode having a catalyst borne thereon, curing the coated composition into a cured film by heating or ultraviolet or electron beam irradiation, and disposing a second electrode having a catalyst borne thereon on the cured film.

Claim 9:

A method for manufacturing an electrolyte film/electrode assembly for fuel cells, comprising the steps of:

coating the fuel cell electrolyte film-forming curable resin composition of claim 1, 2 or 3 onto a first electrode having a catalyst borne thereon, disposing a second electrode having a catalyst borne thereon on the coated composition, and curing the coated composition into a cured film by heating or electron beam irradiation.

BENEFITS OF THE INVENTION

According to the invention, there are available an electrolyte film and an electrolyte film/electrode assembly for use in fuel cells which satisfy cell-related properties including high ion conductivity, low methanol permeability, and film strength as well as productivity at the same time. The fuel cell electrolyte film produced by the method of the invention can have a reduced thickness which leads to effective ion conduction and is thus quite useful as the electrolyte film in polymer electrolyte fuel cells and especially direct methanol-air fuel cells.

THE BEST MODE FOR CARRYING OUT THE INVENTION

Figure 1:
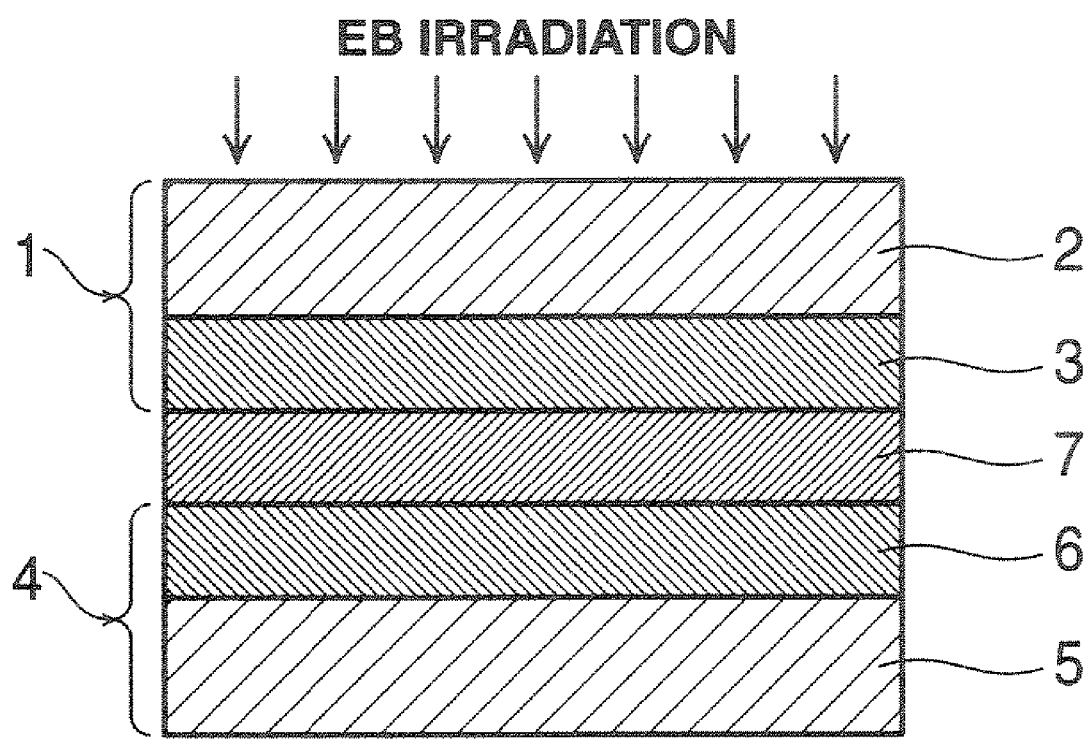
FIG. 1 is a cross-sectional view illustrating one typical method of preparing an electrolyte film/electrode assembly according to the invention.

The curable resin composition of the invention for forming a fuel cell electrolyte film comprises (1) a monomer containing per molecule at least one ethylenically unsaturated group and at least one ion conductive group or precursor group capable of forming an ion conductive group through chemical reaction, (2) an oligomer containing per molecule at least two reactive groups copolymerizable with the ethylenically unsaturated group in component (1) and having a number average molecular weight of at least 400, (3) a fluororesin, and optionally, (4) a solvent.

Examples of the compound or monomer containing at least one ethylenically unsaturated group and at least one ion conductive group or precursor group capable of forming an ion conductive group through chemical reaction in a common molecule, used as component (1), include carboxylic acid group-containing monomers such as (meth)acrylic acid; sulfonic acid group-containing monomers and alkali metal salts thereof such as acrylamide sulfonic acid, styrenesulfonic acid, allylbenzenesulfonic acid, allyloxybenzenesulfonic acid, vinylsulfonic acid, allylsulfonic acid, fluorovinylsulfonic acid, and perfluorovinyl ether sulfonic acid; phosphoric acid group-containing monomers such as methacryloyloxyethyl phosphate; and examples of the compound free of ion conducting functional group (compound capable of imparting ion conduction by utilizing chemical reaction) include glycidyl (meth)acrylate monomers. Those monomers having a molecular weight of less than 1,000 are desirable because the cured films therefrom have higher ion conductivity. Suitable ion conductive groups include carboxylic acid groups, sulfonic acid groups, phosphoric acid groups, and the like, with the sulfonic acid groups being preferred. Examples of the precursor group capable of forming an ion conductive group through chemical reaction include acyloxy groups, ester groups (—COOR wherein R is a monovalent hydrocarbon group), acid imide groups, halogenated sulfonyl groups, glycidyl groups, and the like. The precursor group undergoes chemical reaction with sodium hydroxide, methanol or sodium sulfite, for example, to form a carboxylic acid or sulfonic acid group.

Examples of the oligomer containing per molecule at least two reactive groups copolymerizable with the ethylenically unsaturated group in component (1) and having a number average molecular weight of at least 400, used as component (2), include polyethylene glycol di(meth)acrylate, di(meth)acrylate having a perfluoroalkyl ether structure, polyethylene glycol, polypropylene glycol, polytetramethylene glycol, polybutylene glycol, fluoroethylene glycol, polyether polyacrylates such as diurethane (meth)acrylate of a diol having a perfluoroalkyl ether structure, polyester polyacrylates, (meth)acryloxy group-containing organopolysiloxanes, vinyl group-containing organopolysiloxanes, and alkoxy group-containing organopolysiloxanes. Those oligomers having a number average molecular weight of at least 400 are desirable because the resulting compositions are more curable.

Suitable reactive groups include ethylenically unsaturated groups and they undergo radical polymerization with ethylenically unsaturated groups in component (1) to build up a molecular weight.

It is noted that the number average molecular weight is more preferably 400 to 2,000, and even more preferably 800 to 1,000. The number average molecular weight is determined by gel permeation chromatography on the basis of polystyrene.

No particular limit is imposed on the method of preparing the oligomer serving as component (2). In the case of polyurethane (meth)acrylate oligomers such as diurethane (meth)acrylate, they are preferably prepared by reacting a polyol with a diisocyanate in a ratio OH/NCO<1, and further reacting with a compound having a functional group capable of reacting with residual isocyanate groups (e.g., hydroxyl group) and an acrylic group.

The polyurethane (meth)acrylate oligomers are described in more detail. They may be prepared through urethane-forming reaction of (a) a polyol component, (b) a polyisocyanate component, and (c) a hydroxyl-containing (meth)acrylate compound. The polyurethane (meth)acrylate oligomers may have a number average molecular weight selected in the range of about 400 to about 10,000, and preferably about 400 to about 5,000.

(a) Polyol Component

Examples of the polyol component include polyether polyols, polyester polyols, polycarbonate polyols, and alkyl diols, while fluorinated forms of the foregoing are also effectively used.

[Polyether Polyols]

Examples of suitable polyether polyols include homopolymers or copolymers of alkylene oxides (typically $C_{2-5}$ alkylene oxides such as ethylene oxide, propylene oxide, butylene oxide, tetrahydrofuran, 3-methyl-tetrahydrofuran), homopolymers or copolymers of the foregoing alkylene oxides using aliphatic $C_{12-40}$ polyols (e.g., 1,2-hydroxystearyl alcohol, hydrogenated dimer diol) as an initiator, alkylene oxide (e.g., propylene oxide, butylene oxide, tetrahydrofuran) adducts of bisphenol A, and alkylene oxide (e.g., propylene oxide, butylene oxide, tetrahydrofuran) adducts of hydrogenated bisphenol A. Fluorinated forms of the foregoing compounds are also preferably used. These polyether polyols may be used alone or in combination of two or more.

The preferred polyether polyols include homopolymers or copolymers of $C_{2-4}$ alkylene oxides, especially $C_{3-4}$ alkylene oxides (specifically propylene oxide and tetrahydrofuran), such as polyoxypropylene glycol, polytetramethylene ether glycol, and propylene oxide-tetrahydrofuran copolymers. Fluorinated forms of the foregoing compounds are also preferred. The polyether polyols may have a weight average molecular weight selected, for example, in the range of about 200 to about 10,000.

Commercially available products of the polyether polyols include, for example, (1) PEG600, PEG1000 and PEG2000 by Sanyo Chemical Industries, Ltd. for polyethylene glycol,
(2) Takelac P-21, Takelac P-22 and Takelac P-23 by Takeda Chemical Industries, Ltd. for polyoxypropylene glycol,
(3) PTG650, PTG850, PTG1000, PTG2000 and PTG4000 by Hodogaya Chemical Co., Ltd. for polytetramethylene ether glycol, (4) ED-28 by Mitsui Toatsu Chemicals, Inc. and Excenol 510 by Asahi Glass Co., Ltd. for propylene oxide-ethylene oxide copolymers,
(5) PPTG1000, PPTG2000 and PPTG4000 by Hodogaya Chemical Co., Ltd. for tetrahydrofuran-propylene oxide copolymers,
(6) Unisafe DC-1100 and Unisafe DC-1800 by NOF Corp. for tetrahydrofuran-ethylene oxide copolymers,
(7) Uniol DA-400 and Uniol DA-700 by NOF Corp. for ethylene oxide adducts of bisphenol A,
(8) Uniol DB-400 by NOF Corp. for propylene oxide adducts of bisphenol A, and
(9) Perfluorotriethylene Glycol and Perfluorotetraethylene Glycol by Exfluor Research Corp. and Fomblin Z DOL by Ausimont for perfluoropolyether polyols.

[Polyester Polyols]

Examples of suitable polyester polyols include addition products of diol compounds such as ethylene glycol, propylene glycol, diethylene glycol, dipropylene glycol, 1,5-pentaglycol, 3-methyl-1,5-pentane diol, 1,6-hexane diol and neopentyl glycol to ε-caprolactam or β-methyl-δ-valerolactone; reaction products of the foregoing diol compounds with dibasic acids such as succinic acid, adipic acid, phthalic acid, hexahydrophthalic acid, and tetrahydrophthalic acid; and ternary reaction products of the foregoing diol compounds, the foregoing dibasic acids, and ε-caprolactam or β-methyl-δ-valerolactone.

[Polycarbonate Polyols]

Examples of suitable polycarbonate polyols include diol compounds such as 1,6-hexanediol, 3-methyl-1,5-pentanediol, neopentyl glycol, 1,4-butanediol, 1,5-octanediol, 1,4-bis(hydroxymethyl)cyclohexane, 2-methylpropanediol, dipropylene glycol, dibutylene glycol, and bisphenol A; addition reaction products of the foregoing diol compounds with 2 to 6 moles of ethylene oxide; and reaction products of the foregoing diol compounds with short-chain dialkyl carbonates such as dimethyl carbonate and diethyl carbonate.

Also useful are polyester diols in the form of addition reaction products of these polycarbonate polyols with ethylene oxide, propylene oxide, ε-caprolactam or β-methyl-δ-valerolactone.

Commercially available products of the polycarbonate polyols include Desmophene 2020E by Sumitomo Bayer Co., Ltd. and DN-980, DN-980, DN-982 and DN-983 by Nippon Polyurethane Industry Co., Ltd.

[Alkyl Diols]

Examples of suitable alkyl diols include 1,6-hexanediol, 3-methyl-1,5-pentanediol, neopentyl glycol, 1,4-butanediol, 1,5-octanediol, 1,4-dihydroxycyclohexane, 1,4-bis(hydroxymethyl)cyclohexane, 2-methylpropanediol, tricyclodecane dimethanol, 1,4-bis(hydroxymethyl)benzene, bisphenol A, and perfluoroalkyl diols of 6 to 12 carbon atoms.

Of these polyols, polyether polyols and alkyl diols are preferred for a balance of physical properties and durability of the resin of the invention.

(b) Polyisocyanate Component

Examples of the polyisocyanate component include diisocyanates such as tolylene diisocyanate,
4,4'-diphenylmethane diisocyanate,
hydrogenated 4,4'-diphenylmethane diisocyanate,
xylylene diisocyanate, hydrogenated xylylene diisocyanate,
hexamethylene diisocyanate, isophorone diisocyanate,
1,5-naphthalene diisocyanate, tolidine diisocyanate,
m-phenylene diisocyanate, p-phenylene diisocyanate,
2,2,4-trimethylhexamethylene diisocyanate,
2,4,4-trimethylhexamethylene diisocyanate,
transcyclohexane-1,4-diisocyanate, lysine diisocyanate,
tetramethylxylene diisocyanate, 1,4-cyclohexane diisocyanate,
1,3-cyclohexane diisocyanate,
1,4-bis[isocyanatomethyl]cyclohexane,
methyl-2,4-cyclohexane diisocyanate,
methyl-2,6-cyclohexane diisocyanate, and
norbornene diisocyanate (or 1,3-cyclopentene diisocyanate); and polyisocyanates such as lysine ester triisocyanate,
1,6,11-undecane triisocyanate,
1,8-diisocyanato-4-isocyanatomethyloctane,
1,3,6-hexamethylene triisocyanate,
bicycloheptane triisocyanate,
trimethylhexamethylene diisocyanate,
1,3,5-triisocyanatocyclohexane,
1,3,5-trimethylisocyanatocyclohexane,
2-[3-isocyanatopropyl]-2,5-di[isocyanatomethyl]-bicyclo-[2,2,1]heptane,
2-[3-isocyanatopropyl]-2,6-di[isocyanatomethyl]-bicyclo-[2,2,1]heptane,
3-[3-isocyanatopropyl]-2,5-di[isocyanatomethyl]-bicyclo-[2,2,1]heptane,
5-[2-isocyanatoethyl]-2-isocyanatomethyl-3-[3-isocyanatopropyl]-bicyclo[2,2,1]heptane,
6-[2-isocyanatoethyl]-2-isocyanatomethyl-3-[3-isocyanatopropyl]-bicyclo[2,2,1]heptane,
5-[2-isocyanatoethyl]-2-isocyanatomethyl-2-[3-isocyanatopropyl]-bicyclo[2,2,1]heptane, and
6-[2-isocyanatoethyl]-2-isocyanatomethyl-2-[3-isocyanatopropyl]-bicyclo[2,1,1]heptane. These diisocyanates may be used alone or in admixture.

Among others, 2,4-tolylene diisocyanate and isophorone diisocyanate are preferred for ease of synthesis reaction and a balance of cured film properties.

(c) Hydroxyl-containing (meth)acrylate Compound

Examples of suitable hydroxyl-containing (meth)acrylate compounds include hydroxyalkyl (meth)acrylates (e.g., hydroxy-$C_{2-10}$ alkyl (meth)acrylates such as
2-hydroxyethyl (meth)acrylate, 2-hydroxypropyl (meth)acrylate,
3-hydroxypropyl (meth)acrylate, 2-hydroxybutyl (meth)acrylate,
4-hydroxybutyl (meth)acrylate, pentanediol mono(meth)acrylate,
hexanediol mono(meth)acrylate, and
neopentyl glycol mono(meth)acrylate),
2-hydroxy-3-phenyloxypropyl (meth)acrylate,
2-hydroxyalkyl (meth)acryloyl phosphates,
4-hydroxycyclohexyl (meth)acrylate, cyclohexane-1,4-dimethanol mono(meth)acrylate,
trimethylol propane di(meth)acrylate,
pentaerythritol tri(meth)acrylate, etc., as well as compounds produced through addition reaction of glycidyl or epoxy group-containing compounds (e.g., alkyl glycidyl ethers, allyl glycidyl ethers, glycidyl (meth)acrylates) to (meth)acrylic acid. These hydroxyl-containing (meth)acrylate compounds may be used alone or in combination of two or more. Preferred hydroxyl-containing (meth)acrylate compounds are hydroxy-$C_{2-4}$ alkyl (meth)acrylates, specifically 2-hydroxyethyl (meth)acrylate and 2-hydroxypropyl (meth)acrylate.

The polyurethane (meth)acrylate oligomers can be prepared by reacting the foregoing components. The components which constitute polyurethane (meth)acrylate oligomers are combined, for example, in such a proportion that approximately 0.1 to 0.8 mole, preferably 0.2 to 0.7 mole, more preferably 0.2 to 0.5 mole of hydroxyl groups on the polyol component and approximately 0.2 to 0.9 mole, preferably 0.3 to 0.8 mole, more preferably 0.5 to 0.8 mole of the hydroxyl-containing (meth)acrylate are available per mole of isocyanate groups on the polyisocyanate.

It is not particularly limited how to react the above-described components. The components may be mixed altogether for reaction. Alternatively, the polyisocyanate may be reacted with either one of the polyol component and the hydroxyl-containing (meth)acrylate and then with the other.

Catalysts which can be used in the urethane-forming reactions include organometallic urethane-forming catalysts such as stannous octoate, dibutyltin diacetate, dibutyltin dilaurate, cobalt naphthenate, and lead naphthenate; and amine catalysts such as triethylamine, triethylene diamine, and diazabicycloundecene, while other well-known urethane-forming catalysts may also be used.

Examples of the fluororesin which is used herein as component (3) for the purpose of suppressing the methanol permeability of the cured film include
polytetrafluoroethylene (PTFE),
tetrafluoroethylene-hexafluoropropylene copolymers (FEP),
tetrafluoroethylene-perfluoroalkyl vinyl ether copolymers (PFA),
polychlorotrifluoroethylene (PCTFE),
ethylene-tetrafluoroethylene copolymers (ETFE),
polyvinylidene fluoride (PVDF), polyvinyl fluoride (PVF), and
trifluoroethylene-ethylene copolymers (ECTFE), which may be used alone or in admixture. It is noted that the fluororesins used herein may be commercially available products having a number average molecular weight of about 100,000 to about 600,000.

In the electrolyte film-forming curable resin composition of the invention, a solvent may be used as component (4). The preferred solvents used herein are those in which the ion conductive monomer as component (1) and the oligomer as component (2) are uniformly dissolvable. Examples include ketones such as acetone and methyl ethyl ketone, esters such as ethyl acetate and butyl acetate, ethers such as tetrahydrofuran and dioxane, N,N-dimethylformamide, N,N-dimethylacetamide, dimethyl sulfoxide, aromatic hydrocarbons such as benzene and toluene, aliphatic and alicyclic hydrocarbons such as n-heptane, n-hexane and cyclohexane, and mixtures thereof. Inter alia, polar solvents are more preferable.

In the electrolyte film-forming curable resin composition of the invention, the above-described components are compounded in such amounts that the oligomer (2) is 10 to 400 parts by mass, desirably 20 to 100 parts by mass, and more desirably 25 to 75 parts by mass per 100 parts by mass of the monomer (1). Less than 10 parts by mass of the oligomer may compromise curability whereas more than 400 parts by mass may sometimes lead to a decline of ion conductivity. The fluororesin (3) is compounded in an amount of 10 to 400 parts by mass, desirably 40 to 130 parts by mass, and more desirably 75 to 125 parts by mass per 100 parts by mass of the monomer (1) whereby the cured film can be reduced in permeability of methanol as the fuel without detracting from its ion conductivity. With less than 10 parts by mass of the fluororesin compounded, the effect of suppressing methanol permeation may possibly be reduced whereas more than 400 parts by mass may possibly detract from ion conductivity.

From the coating aspect, the composition should desirably have a viscosity at 25° C. of equal to or less than 100,000 mpa-s, and more desirably 100 to 10,000 mPa-s. A composition with a viscosity of greater than 100,000 mPa-s may have poor leveling property and become difficult to form an even, thin coat whereas a composition with a viscosity of less than 100 mpa-s may cause more cissing and become more penetrable into a substrate. The amount of the solvent (4) compounded is determined from the above and other aspects, and is usually 0 to 2,000 parts by mass, preferably 50 to 1,500 parts by mass, and more preferably 100 to 1,000 parts by mass per 100 parts by mass of the monomer (1).

In the curable resin composition of the invention, an additional monomer not containing an ion conductive group or a precursor group thereof may be included for the purposes of tailoring the elongation, strength, Young's modulus, and glass transition temperature of a cured film, or the like. Suitable additional monomers include styrene, t-butylstyrene, n-lauryl acrylate, 2-ethylhexyl acrylate, n-hexyl acrylate, isooctyl acrylate, 2-phenoxyethyl acrylate, and 2-ethoxyethyl acrylate. The combined use of additional monomer is acceptable as long as it does not significantly compromise the ion conduction of a cured film.

In the inventive composition, heteropolyacids such as phospho-tungstate may be added for the purpose of improving ion conduction. Also, inorganic compounds such as oxides, nitrides or carbides may be added as the filler for the purposes of preventing hydrogen, alcohol, water or oxygen from permeating through the fuel cell. Exemplary fillers include boron nitride, silicon carbide and silica.

The curable resin composition of the invention can be applied onto a film substrate such as polyester film, polypropylene film, polyethylene film or tetrafluoroethylene film and heated or irradiated with ultraviolet radiation (UV) or electron beams (EB) for thereby forming a cured film. The cured film desirably has a thickness of up to 200 μm, and more desirably 1 to 50 μm. A film of more than 200 μm has a greater film resistance when used as the electrolyte film in a fuel cell, leading to a reduced output. A film of less than 1 μm may provide a less barrier to hydrogen gas or methanol as the fuel in the fuel cell, leading to a reduced output.

For curing the curable resin composition of the invention, the composition is preferably heated at a temperature of at least 80° C., more preferably at least 100° C. The upper limit of the heating temperature is selected as appropriate while it is preferably up to 150° C., especially up to 120° C., from the standpoint of heat resistance of curable resin. Although the heating time varies with the heating temperature, it is usually 1 minute to 2 hours, especially 3 minutes to 30 minutes. In an alternative embodiment, UV is irradiated in an exposure dose of at least 10 mJ/cm$^2$, or EB is irradiated so as to provide an absorbed dose of at least 5 kGy. In the case of UV curing, an appropriate exposure dose is 10 to 1,000 mJ/cm$^2$, and more desirably 50 to 500 mJ/cm$^2$. An exposure dose of less than 10 mJ/cm$^2$ may cause the curable resin to cure short whereas an exposure dose in excess of 1,000 mJ/cm$^2$ is uneconomical because of an energy waste and a loss of production efficiency. In the case of EB curing, the absorbed dose is desirably 5 to 500 kGy, and more desirably 10 to 100 kGy because an absorbed dose of less than 5 kGy may lead to undercure and an absorbed dose in excess of 500 kGy may cause decomposition of the curable resin.

For helping the composition cure, heat polymerization initiators such as azobisisobutyronitrile in the case of heat curing, and photo-polymerization initiators such as benzophenone in the case of UV curing may be additionally used. Once a coating of the composition is cured by heating, it may be further cured by irradiation of UV or EB.

The temperature at which UV or EB is irradiated may be around room temperature. In order to adjust the viscosity of the resin composition so that the composition may be effectively coated, and to produce a coating thereof with a consistent thickness and a consistent surface state, the resin composition or the irradiating atmosphere may be controlled in advance to a certain temperature. Desirably, the resin composition and the irradiating atmosphere are controlled to a constant temperature in the range of 25 to 60° C.

The atmosphere in which the curable resin composition is cured is preferably an inert gas atmosphere such as nitrogen, helium or argon so that radical polymerization may readily take place. The gas should preferably have an oxygen concentration of up to 500 ppm, more preferably up to 200 ppm.

As described above, an electrolyte film can be manufactured by coating the fuel cell electrolyte film-forming curable resin composition of the invention onto a substrate to a buildup equal to or less than 200 μm, and curing the coated composition into a cured film by heating or UV or EB irradiation. In the embodiment wherein the monomer (1) has an ion conductive precursor group rather than an ion conductive group, the precursor groups in the cured film must be converted to ion conductive groups by suitable treatment, for example, alkali-assisted hydrolysis or reaction with sodium sulfite.

The curing process as described above yields an electrolyte film in which components (1) and (2) are copolymerized and cured and the fluororesin as component (3) is uniformly dispersed and incorporated in the cured film.

The electrolyte film for fuel cells according to the invention is disposed contiguous to and between first and second electrodes each having a catalyst borne thereon to form an electrolyte film/electrode assembly for fuel cells. Specifically, the electrolyte film/electrode assembly is prepared by either of the following:

method (i) involving applying an electrolyte film-forming curable resin composition having ion conductivity onto a first electrode having a catalyst borne thereon to form a coating, curing the coating into a cured film by heating or UV or EB irradiation, and disposing a second electrode having a catalyst borne thereon contiguous to the cured film, and method (ii) involving applying an electrolyte film-forming curable resin composition having ion conductivity onto a first electrode having a catalyst borne thereon to form a coating, disposing a second electrode having a catalyst borne thereon contiguous to the uncured coating, and curing the curable resin into a cured film by heating or EB irradiation.

Referring to FIG. 1, method (ii) is illustrated. An air electrode 1 includes a catalyst layer 3 coated on a carbon paper 2. Similarly, a fuel electrode 4 includes a catalyst layer 6 coated on a carbon paper 5. 7 denotes a coating of the electrolyte film-forming curable resin composition (or an electrolyte film resulting from curing thereof). For example, the assembly is manufactured by forming the coating 7 on the catalyst layer 6 of the fuel electrode 4, placing the air electrode 1 thereon such that the catalyst layer 3 is contiguous to the coating 7, and then heating or irradiating EB for curing the coating 7, yielding a cured film or electrolyte film.

The electrode having a catalyst borne thereon may be a conventional fuel cell electrode (either fuel electrode or air electrode) on which a catalyst is borne. The construction and material of the electrode may be selected from those well known for fuel cells. The catalyst may also be selected from those well known for fuel cells, for example, platinum base catalysts.

In the above method, a coating of the composition or an electrolyte film is joined to electrodes by compression bonding under about 0.05 to 5 kG/cm² using a press or the like. A firm bond is established between the electrolyte film and the electrodes without a need for hot pressing.

The electrolyte film and the electrolyte film/electrode assembly according to the invention are advantageously used in fuel cells. The fuel cell includes a fuel electrode, an air electrode, and a SPE film in thin film form disposed therebetween and tightly bonded thereto. A catalyst layer, a fuel diffusion layer and a separator are disposed on both sides of the SPE film to construct a fuel cell having improved power generation.

EXAMPLE

Examples of the invention are given below together with Comparative Examples by way of illustration and not by way of limitation. It is understood that the number average molecular weight (Mn) is measured by high-performance GPC system HLC-8220 (Tosoh Corp.), and the viscosity is measured by a rotational viscometer.

Example 1

A reactor was charged with 100 g of fluorotetraethylene glycol having a Mn of 410 and 0.05 g of 2,6-di-tert-butylhydroxytoluene (BHT). In a nitrogen stream at 65-70° C., 84.9 g of 2,4-tolylene diisocyanate was added dropwise to the reactor. After the completion of dropwise addition, the reaction continued at 70° C. for a further 2 hours, followed by addition of 0.02 g of dibutyltin dilaurate. In dry air, 56.6 g of 2-hydroxyethyl acrylate was added dropwise. The reaction continued at 70° C. for a further 5 hours, yielding a fluoropolyether urethane acrylate oligomer having a Mn of 990 (Oligomer A).

50 g of Oligomer A was mixed with 100 g of acrylamidemethylpropanesulfonic acid, 100 g of polyvinylidene fluoride (PVDF) powder having a Mn of 543,000, and 900 g of N,N-dimethylformamide (DMF) as a solvent to form a curable resin composition B of clear fluorescent color having a viscosity of 8,000 mpa-s at 25° C.

Next, using an applicator, the curable resin composition B was applied onto a glass plate to a buildup of 50 μm. In a nitrogen atmosphere having an oxygen concentration of up to 50 ppm, EB irradiation was performed at an accelerating voltage of 300 kV so as to provide an absorbed dose of 50 kGy, yielding a cured film.

The film was immersed in deionized water at 25° C. for 24 hours, after which it was taken out and wiped on the surface with gauze. Using an impedance/gain-phase analyzer 1260 (Schulumberger Technologies) and platinum plates as the electrodes, a proton conductivity at 25° C. was measured to be 0.10 S/cm. By a gas chromatography analyzer, the film was measured for permeability of a 1M methanol aqueous solution at 25° C., finding a permeability of 0.07 kg/m²-h.

Example 2

A 5% isopropyl alcohol solution of Nafion (Aldrich) and carbon having 20% by mass of platinum borne thereon, Vulcan XC-72 (Cabot) were kneaded to form a paste. Using a wire bar, this catalyst paste was applied onto a carbon paper TGP-H-090 (Toray Co., Ltd.) so as to give a coating weight of 0.34 mg/cm² of Pt catalyst. The coating was dried in a hot air circulating dryer at 120° C. for 5 minutes, forming an electrode (fuel electrode).

Using an applicator, the curable resin composition B was applied onto this electrode to a buildup of about 30 μm. An electrode (air electrode) which was similarly constructed as the above electrode (fuel electrode) was laid on the coating. The laminate was press bonded by moving a roller at 5 kG/cm² and room temperature over two back and forth strokes. Using an electron beam-emitting system, the laminate was irradiated, in the way illustrated in FIG. 1, with electron beams in a nitrogen atmosphere having an oxygen concentration of up to 50 ppm, at an accelerating voltage of 300 kV and an absorbed dose of 50 kGy. The curable resin composition effectively cured, and the cured film exhibited a firm bond to both the electrodes.

The film had an ion conductivity of 0.10 S/cm at 25° C. A cell using 1M methanol fuel at 30° C. produced an output of 20 mW/cm$^2$ at a current flow of 100 mA/cm$^2$.

Comparative Example 1

150 g of Oligomer A, prepared in Example 1, was mixed with 100 g of acrylamidemethylpropanesulfonic acid and 400 g of N,N-dimethylformamide (DMF) as a solvent to form a curable resin composition C having a viscosity of 10 mPa-s at 25° C. As in Example 1, a cured film was produced and its proton conductivity at 25° C. was measured to be 0.10 S/cm. By a gas chromatography analyzer, the film was measured for permeability of a 1M methanol aqueous solution at 25° C., finding a permeability of 0.40 kg/m$^2$-h.

Comparative Example 2

A film was produced as in Example 2 aside from using the curable resin composition C of Comparative Example 1. The film had an ion conductivity of 0.10 S/cm at 25° C. A cell using 1M methanol fuel at 30° C. produced an output of 9 mW/cm$^2$ at a current flow of 100 mA/cm$^2$.

The invention claimed is:

1. A fuel cell comprising an electrolyte film which is a cured film obtained by
polymerizing and curing:
(1) 100 parts by mass of a monomer containing per molecule at least one ethylenically unsaturated group and at least one ion conductive group or at least one precursor group capable of forming an ion conductive group through chemical reaction; and
(2) 10 to 400 parts by mass of a fluoropolyether urethane acrylate oligomer containing per molecule at least two reactive groups copolymerizable with the at least one ethylenically unsaturated group in component (1) and having a number average molecular weight of at least 400, with the proviso that when component (1) contains the precursor group, the precursor group is converted into an ion conductive group;
wherein 10 to 400 parts by mass of a fluororesin is uniformly dispersed and incorporated in the cured film.

2. The fuel cell of claim 1, wherein the ion conductive group in component (1) is a sulfonic acid group.

3. The fuel cell of claim 1, wherein the fluororesin as component (3) is selected from the group consisting of polytetrafluoroethylene, tetrafluoroethylene-hexafluoropropylene copolymers, tetrafluoroethylene-perfluoroalkyl vinyl ether copolymers, polychlorotrifluoroethylene, ethylene-tetrafluoroethylene copolymers, polyvinylidene fluoride, polyvinyl fluoride, and trifluoroethylene-ethylene copolymers.

4. A method for producing the fuel cell of claim 1, comprising:
coating the fuel cell electrolyte film-forming curable resin composition of claim 1, wherein the monomer as component (1) contains the ion conductive group, onto a substrate to a buildup of up to 200 µm; and
curing the coated curable resin composition to form a cured film by heating, ultraviolet irradiation or electron beam irradiation.

5. A method for producing a fuel cell electrolyte film, comprising:
coating the fuel cell electrolyte film-forming curable resin composition of claim 1, wherein the monomer as component (1) contains the precursor group capable of forming an ion conductive group, onto a substrate to a buildup of up to 200 µm;
curing the coated curable resin composition to form a cured film by heating, ultraviolet irradiation or electron beam irradiation; and
converting the precursor groups into ion conductive groups.

6. A method for manufacturing an electrolyte film/electrode assembly for fuel cells, comprising:
coating the fuel cell electrolyte film-forming curable resin composition of claim 1 onto a first electrode having a catalyst borne thereon;
curing the coated composition into a cured film by heating, ultraviolet irradiation or electron beam irradiation; and
disposing a second electrode having a catalyst borne thereon on the cured film.

7. A method for manufacturing an electrolyte film/electrode assembly for fuel cells, comprising:
coating the fuel cell electrolyte film-forming curable resin composition of claim 1 onto a first electrode having a catalyst borne thereon;
disposing a second electrode having a catalyst borne thereon on the coated composition; and
curing the coated composition into a cured film by heating or electron beam irradiation.

8. A fuel cell, comprising an electrolyte film/electrode assembly, comprising:
an electrolyte film disposed between first and second electrodes, each of the first and second electrodes having a catalyst borne thereon,
said electrolyte film comprising a cured film prepared by polymerizing and curing
(1) 100 parts by mass of a monomer containing per molecule at least one ethylenically unsaturated group and at least one ion conductive group or at least one precursor group capable of forming an ion conductive group through chemical reaction, and
(2) 10 to 400 parts by mass of a fluoropolyether urethane acrylate oligomer containing per molecule at least two reactive groups copolymerizable with the at least one ethylenically unsaturated group in component (1) and having a number average molecular weight of at least 400, with the proviso that if component (1) contains the precursor group, the precursor group is converted into an ion conductive group;
wherein 10 to 400 parts by mass of a fluororesin is uniformly dispersed and incorporated in the cured film.

* * * * *